(12) United States Patent
Langel

(10) Patent No.: US 8,426,995 B2
(45) Date of Patent: Apr. 23, 2013

(54) WIND TURBINE GENERATOR AND WIND TURBINE

(75) Inventor: Andre Langel, Stadtlohn (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/287,167

(22) Filed: Nov. 2, 2011

(65) Prior Publication Data
US 2012/0133142 A1  May 31, 2012

(51) Int. Cl.
*F03D 9/00*  (2006.01)

(52) U.S. Cl.
USPC ............................................. 290/44; 290/55

(58) Field of Classification Search ............ 290/44, 290/55
See application file for complete search history.

(56) References Cited

U.S. PATENT DOCUMENTS

| | | | |
|---|---|---|---|
| 6,380,653 B1 * | 4/2002 | Seguchi | 310/112 |
| 6,836,028 B2 * | 12/2004 | Northrup et al. | 290/44 |
| 7,629,705 B2 * | 12/2009 | Barker et al. | 290/55 |
| 2011/0316287 A1 * | 12/2011 | Stiesdal | 290/55 |

OTHER PUBLICATIONS

"Modular, Flexible, Economical: Drive Components and Solutions for Decentralized Drive Systems," SEW Eurodrive Brochure, Nov. 2007; pp. 10-13.
"8200 motec/starttec," Lenze Catalog, Dec. 2003; pp. 2-1 to 2-18.

* cited by examiner

*Primary Examiner* — Tho D Ta
(74) *Attorney, Agent, or Firm* — Global Patent Operation; Douglas D. Zhang (57) ABSTRACT

According to the present disclosure, a wind turbine power generator (118) including a stator (120) comprising at least one stator segment (120, 121), a rotor (122) rotatably mounted in the stator (120, 121) and one or more conversion assemblies (210, 220, 222) is provided. The one or more power conversion assemblies (210, 220) are attached to the at least one stator segment (120, 121).

18 Claims, 9 Drawing Sheets

WIND TURBINE GENERATOR AND WIND TURBINE

BACKGROUND OF THE INVENTION

The subject matter described herein relates generally to methods and systems for wind turbines, and more particularly, to methods and systems regarding the power generator of a wind turbine, even more particularly, the stator of a wind power generator and the positioning of the power converter.

Large scale wind turbines that feed electrical power into electrical supply grids have been growing rapidly in recent years. This growth rate can be traced back to the many environmental, technical and economic benefits and improvements of wind energy technologies. Wind energy enables a reduction in use of fossil fuels as energy source, which consequentially reduces the production of greenhouse gases. Furthermore, wind energy is widely available, renewable and clean. Technical developments have improved design, manufacturing technologies, materials and power electronic devices of wind turbines that enable the production of robust and efficient wind turbines at lower costs.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

In some known wind turbines, the nacelle of a wind turbine contains the essential machinery and power electronic devices that enable the efficient conversion of wind energy into electrical energy such as the generator and possibly the power converter. Sometimes, the converter is in the lower part of a wind turbine tower. As heart of a wind turbine, the nacelle must function reliably and cost efficiently throughout the service life of the wind turbine. Usually, the space inside the nacelle is limited and a high number of power cables or bus-bars are used to connect the individual power electronic components, which add costs.

Furthermore, known wind turbines have a plurality of mechanical and electrical components, which may have independent or different operating limitations, such as current, voltage, power, and/or temperature limits, than other components. Since, many of the electrical and/or mechanical components come together for the first time after being installed in the wind turbine, known wind turbines typically are designed and/or assembled with predefined rated power limits. To operate within such rated power limits, the electrical and/or mechanical components may be operated with large margins for the operating limitations. Such operation may result in inefficient wind turbine operation, and a power generation capability of the wind turbine may be underutilized.

For this purpose, it will be appreciated that easy testing of the mechanical and power electronic components before installation, to ensure an optimum compatibility between the components and an efficient, harmonious, long-lasting and trouble-free operation of the wind turbine is desired. Further, easy repair and exchange of faulty parts as well as the reduction of material costs inside the nacelle and an increase in overall efficiency of the wind turbine is desirable.

Hence, the subject matter described herein pertains to improved assembly methods and systems, in particular with respect to power generators and power converters, in order to achieve the aforementioned cost, reliability, spatial, material and maintenance benefits.

BRIEF DESCRIPTION OF THE INVENTION

In one aspect, a wind turbine power generator, including: a stator with at least one stator segment, a rotor rotatably mounted in the stator and one or more conversion assemblies is provided. The power generator includes one or more conversion assemblies that are mechanically attached to the at least one stator segment. The one or more conversion assemblies may also be integrally connected to the at least one stator segment. Further, the one or more conversion assemblies may be preassembled to the at least one stator segment.

In another aspect, a wind turbine, including: a nacelle supported by a tower, at least one rotor blade to capture wind energy and a power generator for converting kinetic energy into electric energy including a stator with at least one stator segment, a rotor rotatably mounted in the stator and one or more conversion assemblies is provided. The power generator includes one or more conversion assemblies that are integrally connected to the at least one stator segment. The one or more conversion assemblies may also be mechanically attached to the at least one stator segment. Further, the one or more conversion assemblies may be preassembled to the at least one stator segment.

In yet another aspect, a method for attaching one or more conversion assemblies to the stator of a wind turbine generator, wherein said generator includes at least one stator segment is provided. The method includes: providing one or more conversion assemblies and at least one stator segment; mechanically attaching the one or more conversion assemblies to the at least one stator segment; and, installing the power generator with preassembled one or more conversion assemblies into the nacelle of a wind turbine. Further, the one or more conversion assemblies may be integrally connected or preassembled to the at least one stator segment.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying Figs wherein.

DETAILED DESCRIPTION OF THE INVENTION

Reference will now be made in detail to the various embodiments, one or more examples of which are illustrated in each Fig. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "conversion assembly" is intended to be representative of an AC-DC-AC power converter optionally including a DC link. Further, the term "conversion assembly" may also be representative of an AC-DC power converter or a DC-AC power converter both optionally with part of a DC link. As used herein the term "full frequency converter" is intended to be representative of a converter that is able to convert frequencies in the range of 0 to 200 Hz or more.

As used herein the term "generator-side converter" is intended to be representative of the portion of a power converter that is linked with the rotor or stator of a power generator, and usually includes an AC-DC converter and optionally part of a DC link. As used herein the term "line-side converter" is intended to be representative of the portion of a power converter that is linked with an electrical supply grid, and usually includes a DC-AC converter and optionally part of a DC link.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy.

As used herein, the term "wind generator" is intended to be representative of any wind turbine that generates electrical power from rotational energy generated from wind energy, and more specifically, converts mechanical energy converted from kinetic energy of wind to electrical power.

As used herein the term "stator" is intended to be representative of the stationary part of a rotor system, typically found in an electric power generator. As used herein the term "at least one stator segment" is intended to be representative of a stator segment, which may also include a stator made out of one segment (e.g. an unsegmented stator). As used herein the term "stator pocket" is intended to be representative of a cavity or hollow space within the stator of a power generator.

As used herein, the term "inside the tower" is intended to be representative of any location inside a wind turbine base, tower or nacelle. As used herein, the term "outside the tower" is intended to be representative of any location outside of a wind turbine.

The embodiments described herein include a wind turbine system that enables a reduced nacelle size by mechanically attaching or integrally connecting one or more conversion assemblies on or in the at least one stator segment of a Multi-Mega-Watt class power generator. Hence, the one or more power conversion assemblies may be mechanically attached or integrally connected to the at least one stator segment of a Multi-Mega-Watt class power generator, which in its turn may be mechanically attached to a wind turbine. Multi-Mega-Watt class power generators are typically generators with an energy production capacity of between 1 and 10 MW, and more.

More redundancy, which increases the reliability of the power generator, may be achieved through several power conversion assemblies or generator units. Not limited to any particular embodiment, for example, each of the at least one stator segment of a power generator may include one or multiple stator windings or sets of stator windings that may be connected individually or in groups to the same conversion assembly, optionally connected in series or parallel to each other, or individually or in groups to separate power conversion assemblies or in any combinations thereof.

In embodiments, where one or multiple stator windings of at least one stator segment are connected individually or in groups to the same conversion assembly, in the case of an electric failure or malfunction of one or more stator windings, the power from the remaining stator windings prevents the interruption of power to the conversion assembly. Similarly, where one or multiple stator windings of at least one stator segment are individually or in groups connected to each other, preferably in parallel, in the case that one or more stator windings fail to provide electric power, the remaining stator windings ensure uninterrupted delivery of power to the conversion assembly.

In further embodiments, one or multiple stator windings of at least one stator segment may be connected individually or in groups to separate conversion assemblies. In case one or more stator windings or power conversion assemblies fail during operation of the generator, the remaining stator windings and power conversion assemblies provide channels for transmitting the produced power.

One or more electric fuses or circuit breakers may be provided to any of the embodiments herein. The circuit breaker may enable safe replacement of a stator winding, stator segment or conversion assembly without interrupting the operation of the generator. Further, such circuit breakers may enable to shut down only a specified section of a generator.

Attaching the one or more conversion assemblies or a part of them in or on the at least one stator segment allows for an integrated packaging of the system, safes cable or bus-bar connections from conversion assembly to generator and frees up space. Further, because the connections between the one or more conversion assemblies and generator are short, there is no need for additional protection close to a permanent magnet generator. Furthermore, when only part of the one or more power conversion assemblies is mechanically attached or integrally connected to the at least one stator segment, line filters may be omitted from being mechanically attached or integrally connected to the at least one stator segment, which may reduce the weight of the at least one stator segment.

In addition, the power generator of the Multi-Mega-Watt class and one or more conversion assemblies may be tested conveniently as a system at or before delivery prior to installing them into the nacelle of a wind turbine. Further, in case of defective or worn out parts it is easy to exchange the one or more conversion assemblies with or without the at least one stator segment and without interrupting the operation of the generator, which prevents downtimes of the generator.

Furthermore, since a conversion assembly is not much in weight compared to the at least one generator segment, the existing mechanical structures are typically able to handle the additional weight. Hence an additional structure for the one or more conversion assemblies is normally not needed, which creates further cost and space advantages.

Through the compact and integrated design, also the cooling system connections can be very short and a single cooling system may be sufficient for both the generator and the one or more conversion assemblies. Also, material savings may be made with respect to main drivers such as, for example, of drivers that control the one or more conversion assemblies. Finally, because the generator and the one or more conversion assembly system include a great number of the same pieces, the advantages of mass production apply at a much lower number of systems.

In some embodiments herein, the stator of a wind power generator may be segmented with each segment weighing, for example, between 5 and 15 tons depending on the generator's power output. One or more of the stator segments may include a stator pocket with an opening into which a conversion assembly or part of a conversion assembly may be placed. The conversion assembly typically may weigh between 350 and 750 kg or approximately 5 to 15% by weight of one stator segment. These value ranges are not exclusive since the weight of the conversion assembly may vary according to the wind turbine size, power production capability and specific configuration of the conversion assembly, which may included further power electronic devices such as, for example, filters or contactors. The cavity is dimensioned such that enough hollow space is made available to partly or fully enclose the conversion assembly including cable or bus-bar connections.

According to embodiments, the stator pocket is located in such a manner that it does not interfere with the magnetic flow of the power generator. The opening to the stator pocket may be positioned in such a way that the conversion assembly may be accessed from either front or back side, or from along and around the radial surface of the generator housing such that a simple and convenient exchange of the conversion assembly can take place in case of malfunction or failure.

The stator pocket and cover may further be lined with insulating material, which shields the conversion assembly from, for example, heat produced by the generator. Furthermore, the cover may close the opening in order to protect the conversion assembly from outside influences. The cover may be designed to enable entry or exit of the power cables, bus-bar connections as well as cooling system. Particular shapes of the cover may include aerating slits or openings to allow circulation of air to and from the conversion assembly.

Typically, the cooling system employs air cooling such as open ventilation (OV) for the rotatable rotor portion of the generator and/or water cooling such as totally enclosed water-to-air cooling (TEWAC) for the at least one stator segment of the generator. In general, different combinations of the following cooling methods are possible to cool the power generator: direct water, water to air, water to water, air to water, air to air, or direct air. Since the power generator and conversion assembly may have similar working temperatures, the water-to-air heat exchanger of the generator may also regulate the temperature of the conversion assembly or at least of part of the conversion assembly. A single cooling system may be employed for both the power generator and conversion assembly. Usually, the water-to-air heat exchanger may be located close to or inside of the generator. Hence, the connections of the cooling system to and from the conversion assembly may be minimized.

In further embodiments herein, the one or more conversion assemblies may be attached to the front or back side of the at least one stator segment, on the radial surface of the at least one stator segment, or somewhere along and around the radial surface, front side or back side of the generator housing. Hence, easy access to the one or more converters would be enabled. Not limited to a particular embodiment the one or more conversion assemblies may be attached to the at least one stator segment or generator housing mechanically, physically or integrally, for instance, by welding, screwing, bolting or any other friction/form fit that may, for example, include magnetic or adhesive forces. In general, the number of power conversion assemblies may be smaller than the number of stator segments or the number of power conversion assemblies may be larger than the number of stator segments.

Not limited to one particular embodiment herein, the at least one stator segment of the power generator may include one or more conversion assemblies. Further, the one or more conversion assemblies may include full frequency AC-DC-AC converters generally with a DC link. However, the one or more conversion assemblies may also include a full frequency AC-DC converter and a separate full frequency DC-AC converter that may be connected to each other via a DC link. In the case of the use of two spatially separated full frequency AC-DC and DC-AC converters connected via a DC link, usually, the AC-DC converter may be mechanically connected to the generator, which is usually located in the nacelle of a wind turbine and the DC-AC converter that transmits the electric energy into an electric supply grid may be located inside or outside of the wind turbine tower.

Typically, a breaker or fuse may be employed in any of the conversion assembly layouts described in the embodiments herein. For example, in embodiments that include one conversion assembly per stator segment, each stator segment may also include a breaker for protection. Usually, each breaker or fuse may be located between the conversion assembly and the transformer, for instance attached inside or on each of the stator segments. Embodiments herein, where part of the conversion assembly and DC link are not attached to the power generator stator segments may include at least one breaker or fuse that may be also not attached to the stator segments.

In embodiments herein, the individual DC links of the one or more separate full frequency AC-DC and DC-AC converters may be connected to a DC collector system directly. The DC collector system connects the DC links of the generator-side converter preferably in series to the at least one line-side converter to increase system voltage. Increased system voltage may decrease power losses. Similarly, one or more full frequency AC-DC-AC converters may be connected preferably in series to increase system voltage and decrease power losses before eventually being fed into an electrical supply grid.

Additionally, a DC collector system may connect the individual DC links of AC-DC generator-side converters of more than one wind turbine for instance of an on-or offshore wind park in series or parallel to one or more central full frequency DC-AC line-side converters. In a similar fashion one or more full frequency AC-DC-AC converters of more than one wind turbine for instance of an on- or offshore wind park may be connected in series or parallel before eventually being fed into an electrical supply grid.

Figure 1:
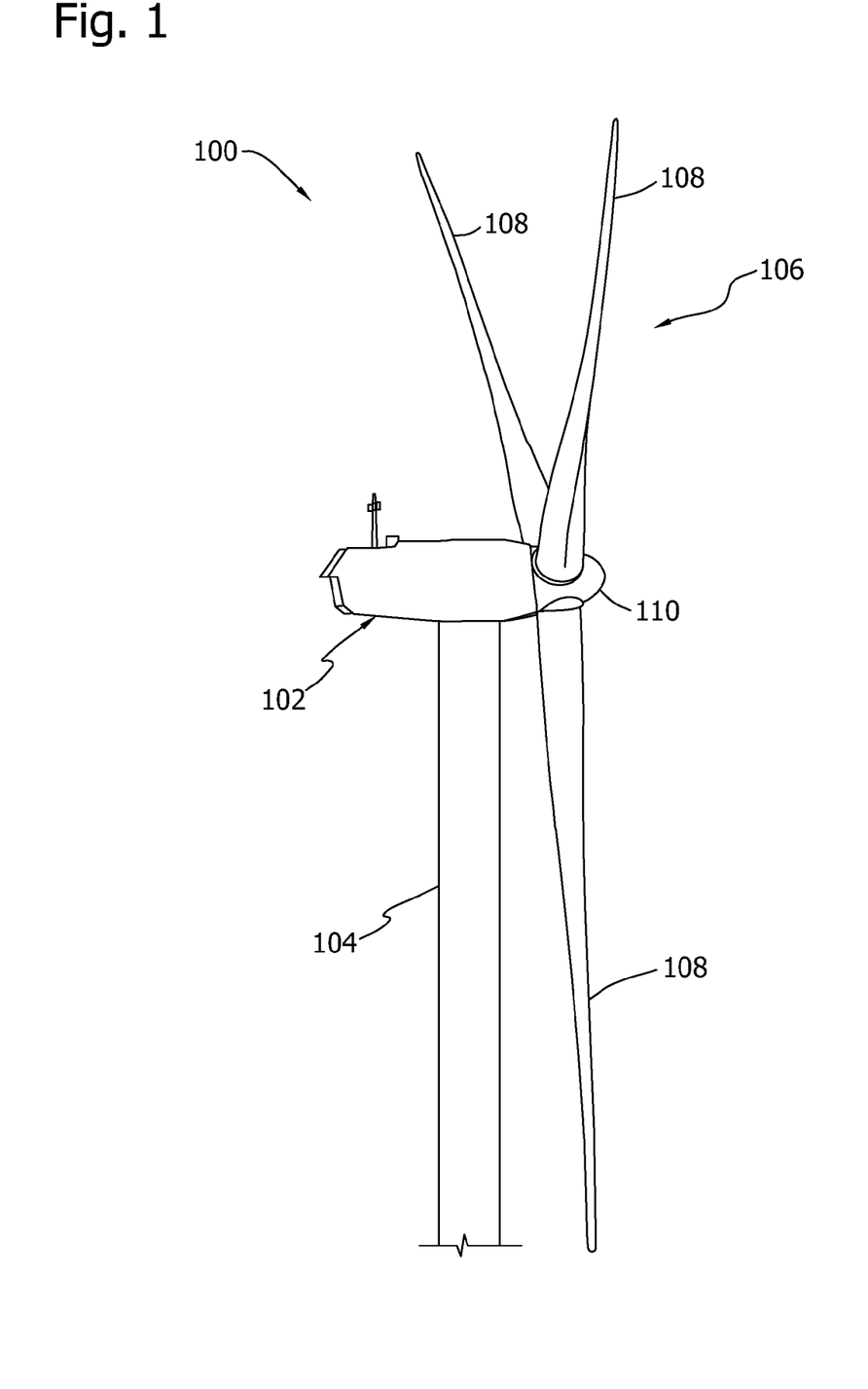
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
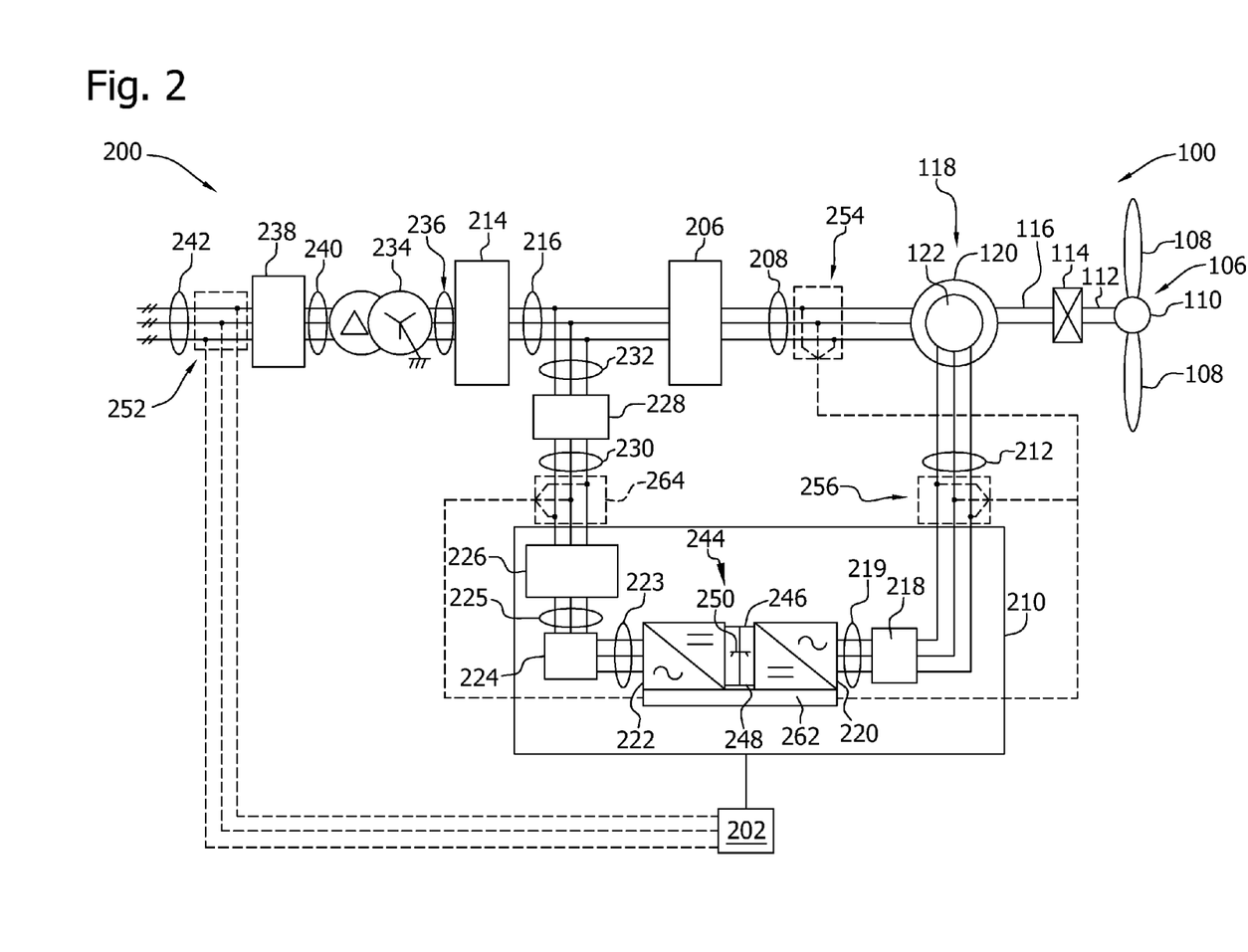
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings. Hence, in general, and not limited to a particular embodiment the generator may be any type of synchronous generator with electrical excitation.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 to process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a generator-side power converter 220 and generator-side power converter 220 is electrically coupled to a line-side power converter 222. Generator-side power converter 220 and line-side power converter 222 are power converter bridges including power semiconductors (not shown). In the exemplary embodiment, generator-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, generator-side power converter 220 and line-side power converter 222 have any configuration using any switching devices that facilitate operation of electrical and control system 200 as described herein. Power conversion assembly 210 is coupled in electronic data communication with turbine controller 202 to control the operation of generator-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, generator-side power converter 220 is coupled in electrical communication with line-side power converter 222 via a single direct current (DC) link 244. Alternatively, generator-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with generator-side power converter 220. Generator-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of generator-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to generator-side power converter 220 and generator-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from generator-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
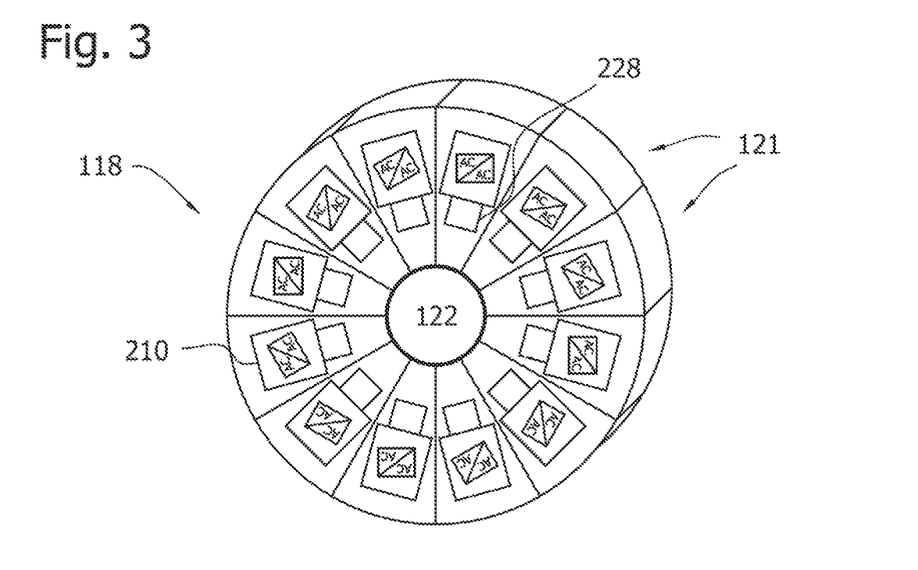
FIG. 3 is a schematic view according to embodiments herein showing a generator with a segmented stator, where each stator segment is provided with a conversion assembly.
Figure 4:
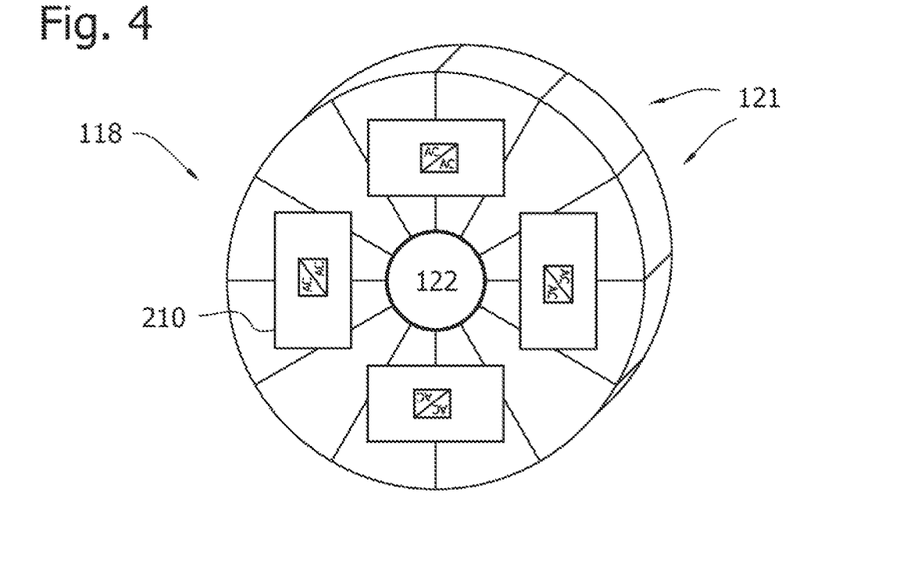
FIG. 4 is a schematic view according to embodiments herein showing a generator with a segmented stator and four conversion assemblies.
Figure 5:
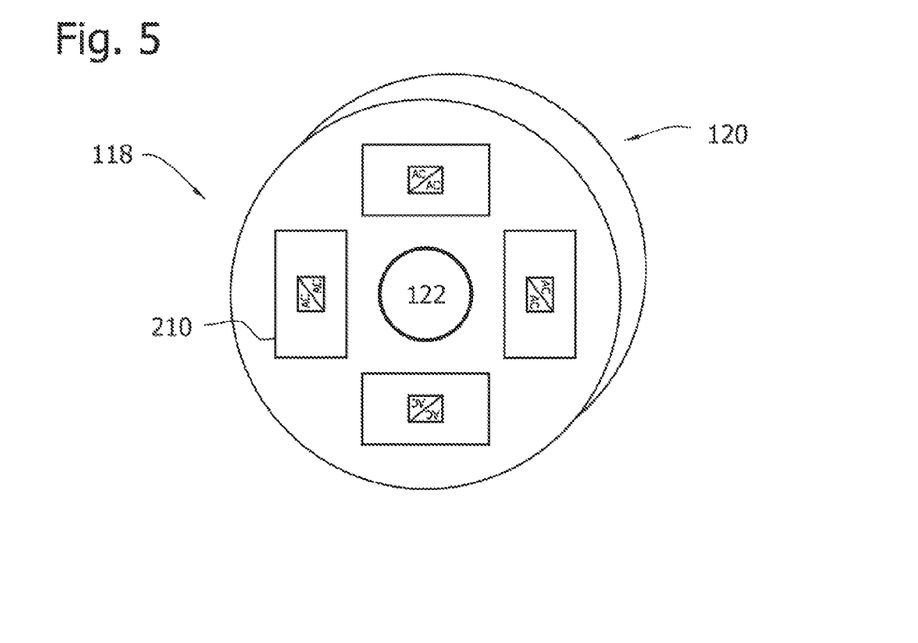
FIG. 5 is a schematic view according to embodiments herein showing a generator with an unsegmented stator and four conversion assemblies.

FIGS. 3 to 5 are embodiments described herein that show a wind turbine power generator 118 with stator 120 that may include one or more stator segments 121. Further, FIGS. 3 to 5 include rotor 122, which is rotatably mounted inside of stator 120 or stator segments 121. Furthermore, one or more power conversion assemblies 210 are mounted to the stator 120 that may include one or more stator segments 121. Conversion assembly 210 is typically a full frequency AC-DC-AC power converter, which includes a DC link, generator-side AC-DC and line-side DC-AC power converters that may both function as inverters or rectifiers depending on the mode of operation.

The embodiment described herein and illustrated in FIG. 3 shows wind turbine power generator 118 and segmented stator 121 with at least one power conversion assembly 210 per stator segment 121. The power conversion assemblies 210 are removably mounted to the front side or back side of each stator segment 121 or to both the front side and back side.

Not limited to this embodiment, typically, power cables of stator segments branch from a generator in radial direction; hence power cables of power conversion assemblies mounted to stator segments may also branch in such a direction (not shown in the Figs.). Bundles of power cables arranged in such a manner are more compact and safe additional space in a nacelle or a wind turbine. Cooling system connections may be arranged in a similar fashion to free space in a nacelle and to shorten the cooling system connections (also not shown in the Figs.). Other material savings that may be achieved by mechanically attaching one or more conversion assemblies directly to a power generator are with respect to main drivers, especially, in the case, when one or more full frequency AC-DC-AC power converters are attached to the power generator.

According to embodiments herein, illustrated in FIG. 4, wind turbine generator 118 may have twelve stator segments 121 and/or four power conversion assemblies 210 removably attached to the front or back side of stator segments 121. Not limited to any particular embodiments, it is generally possible that the number of power conversion assemblies is smaller than the number of stator segments or that the number of power conversion assemblies is larger than the number of stator segments. However, more than one stator segment 121 may be connected to one power conversion assembly 210.

FIG. 5 shows wind turbine generator 118 with stator 120 and four power conversion assemblies 210 according to embodiments described herein. Power conversion assemblies 210 are removably mounted to the front or back side of stator 120 surrounding stator 122 in a symmetrical arrangement. However, and not confined to this particular embodiment, two or more conversion assemblies may be arranged in an asymmetrical manner on the stator or stator segments of a wind turbine generator.

Figure 6:
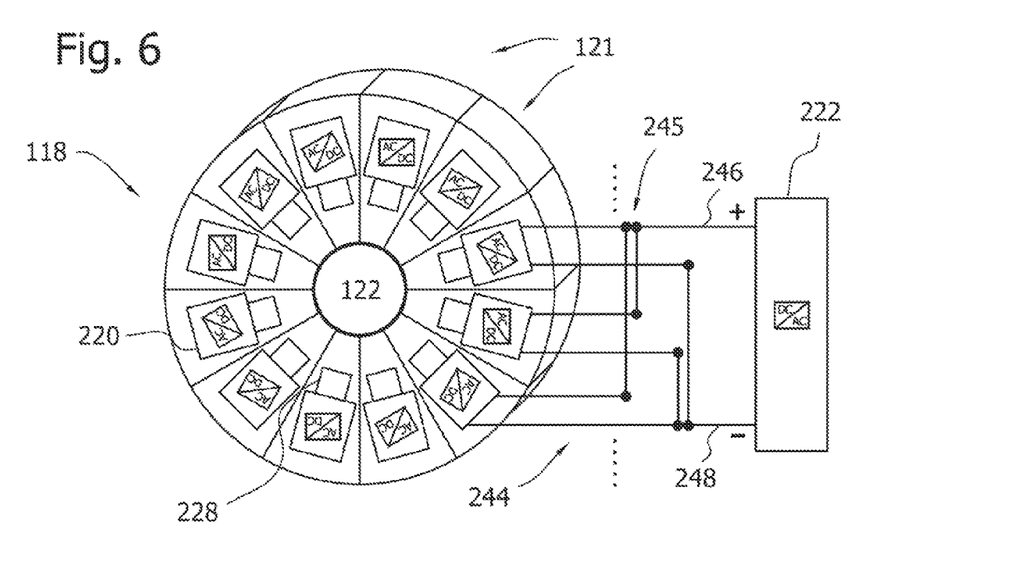
FIG. 6 is a schematic view according to embodiments herein showing a generator with a segmented stator, where each stator segment is provided with part of a conversion assembly, which may be connected in series to another part of a conversion assembly.
Figure 7:
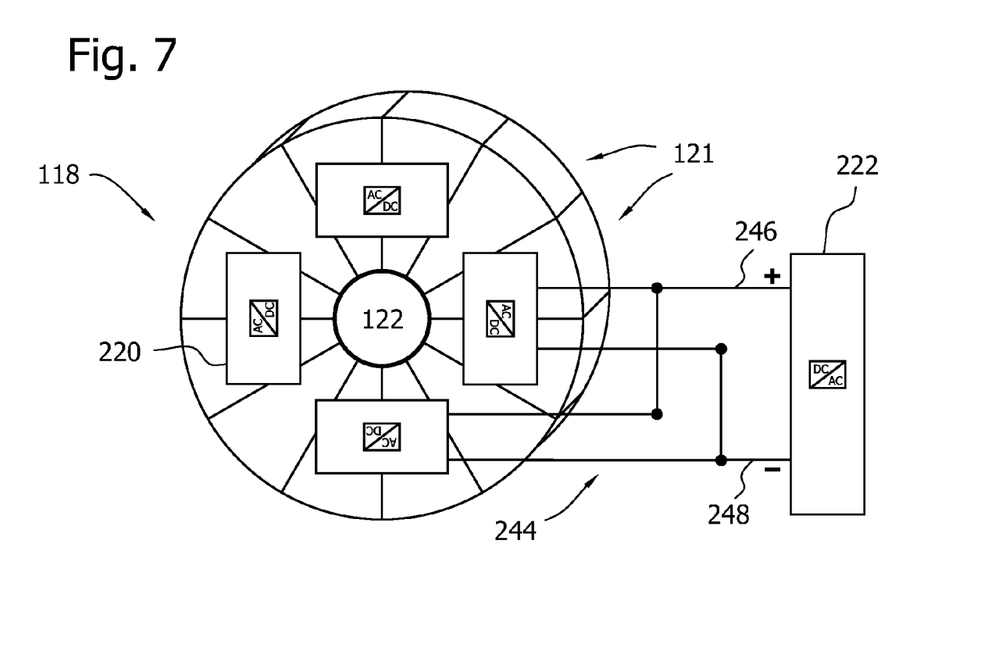
FIG. 7 is a schematic view according to embodiments herein showing a generator with a segmented stator and four parts of conversion assemblies.
Figure 8:
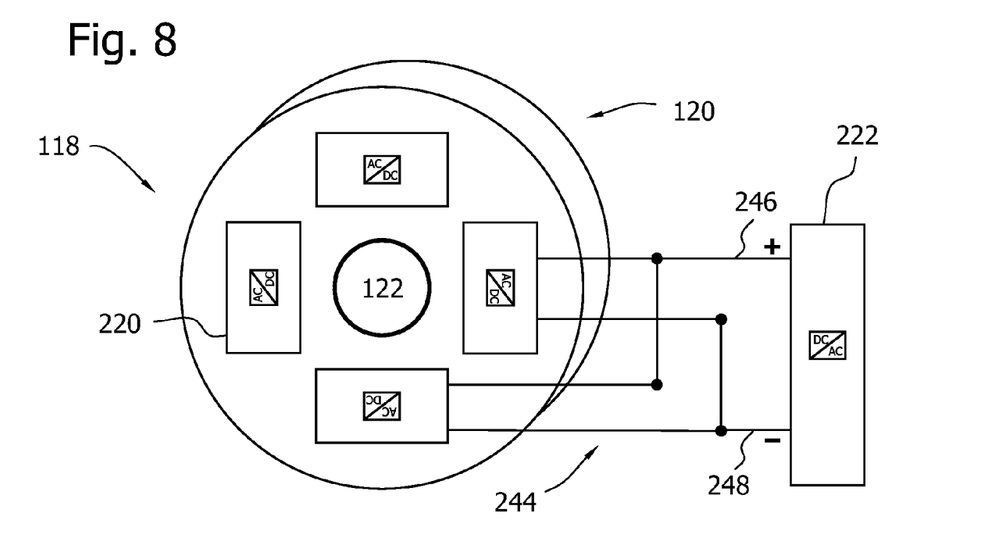
FIG. 8 is a schematic view according to embodiments herein showing a generator with an unsegmented stator and four parts of conversion assemblies.

FIGS. 6 to 8 illustrate embodiments described herein, which show wind turbine generator 118 with stator 120 or more than one stator segments 121 and further including a rotor 122, which is rotatably mounted inside of stator 120 or stator segments 121. Generator-side power converter 220, typically an AC-DC converter includes part of DC link 244. Line-side power converter 222, typically a DC-AC converter, which includes the other part of the DC links 244, is connected to generator-side power converter 220 via the DC link 244, which includes positive rail 246 and negative rail 248.

FIG. 6, according to some embodiments herein, illustrates embodiments of wind turbine generator 118 with one generator-side power converter 220 removably attached to the front or back side of each of the twelve stator segments 121. Two or a plurality of generator-side power converters 220 may be connected in series to a DC collector system 245, which increases system voltage. DC collector system 245 is connected to line-side power converter 222 by positive rail 246 and negative rail 248. The number of line-side power converters attached to a plurality of generator-side power converters via numerous DC collector systems may vary (shown in FIG. 9).

FIG. 7 illustrates embodiments described herein including wind turbine generator 118 with stator segments 121 and rotatable rotor 122, wherein four generator-side power converters 220 including part of DC link 244 are mounted symmetrically across the front or back side of the twelve stator segments 121. Two or more of the generator-side power converters 220 may be connected via DC link 244, including positive rail 246 and negative rail 248 to one line-side power converter 222 or more than one line-side power converter 222 (shown in FIG. 9), which includes the other part of DC link 244.

Figure 9:
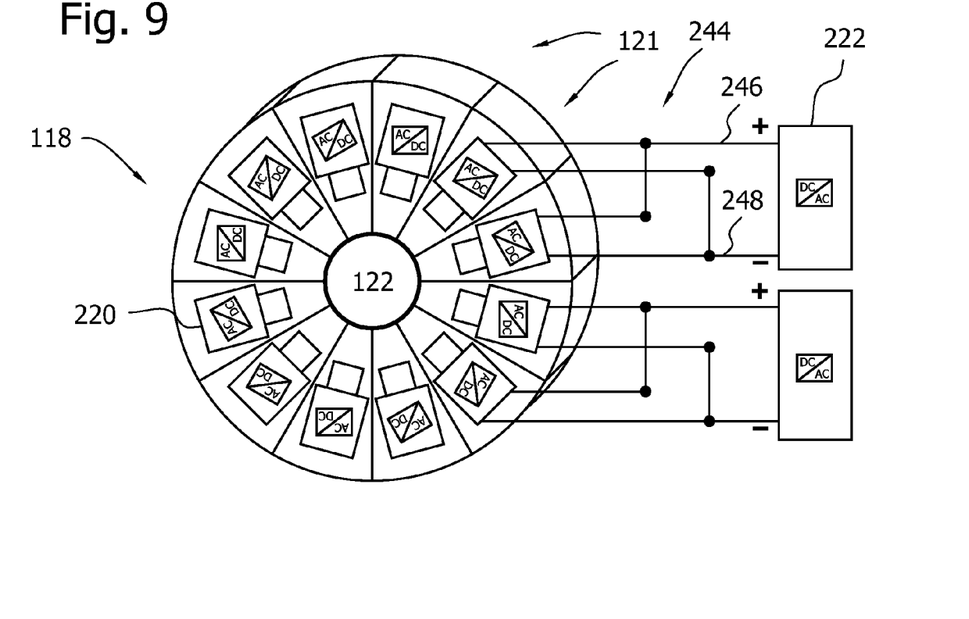
FIG. 9 is a schematic view according to embodiments herein showing a generator with a segmented stator, where each stator segment is provided with parts of a conversion assembly.

FIG. 8 shows embodiments with wind turbine generator 118, stator 120 and rotor 122, further including four generator-side power converters 220 removably arranged symmetrically across the front or back side of stator 120. Each of the generator-side power converters 220 includes part of DC link 244. The four generator-side power converters 220 are connected to one line-side power converter 222 (or more than one line-side power converter as shown in FIG. 9) that include the other part of the DC link 244. Positive rail 246 and negative rail 248 connect the generator-side 220 and line-side 222 power converters.

FIG. 9 illustrates connecting a plurality of generator-side converters 220, which are attached to stator segments 121, to a plurality of line-side converters 222 via a DC link 244 according to embodiments described herein. Not limited to the embodiments shown in FIG. 6, a plurality of DC collector systems 245 may be employed in any of the embodiments described herein.

Figure 10:
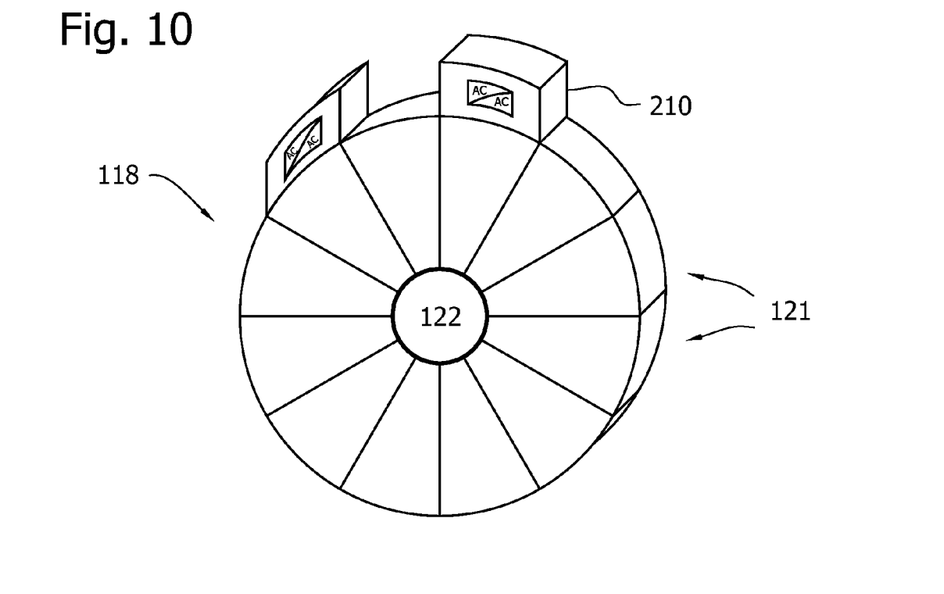
FIG. 10 is a schematic view according to embodiments herein showing a generator with a segmented stator and two conversion assemblies positioned on the radial surface of the stator segments.

FIG. 10 shows wind turbine generator 118, stator segments 121 and two full frequency power conversion assemblies 210 mechanically connected on the radial surface of the stator according to embodiments described herein. Generally, the number of power conversion assemblies may vary and is not necessarily related to the number of stator segments. In embodiments, at least one conversion assembly may be mounted on the radial surface of the stator or of the generator housing (not shown in the Figs.) The conversion assembly may include an AC-DC-AC full frequency power converter or a generator-side AC-DC full frequency power converter and part of a DC link.

Figure 11:
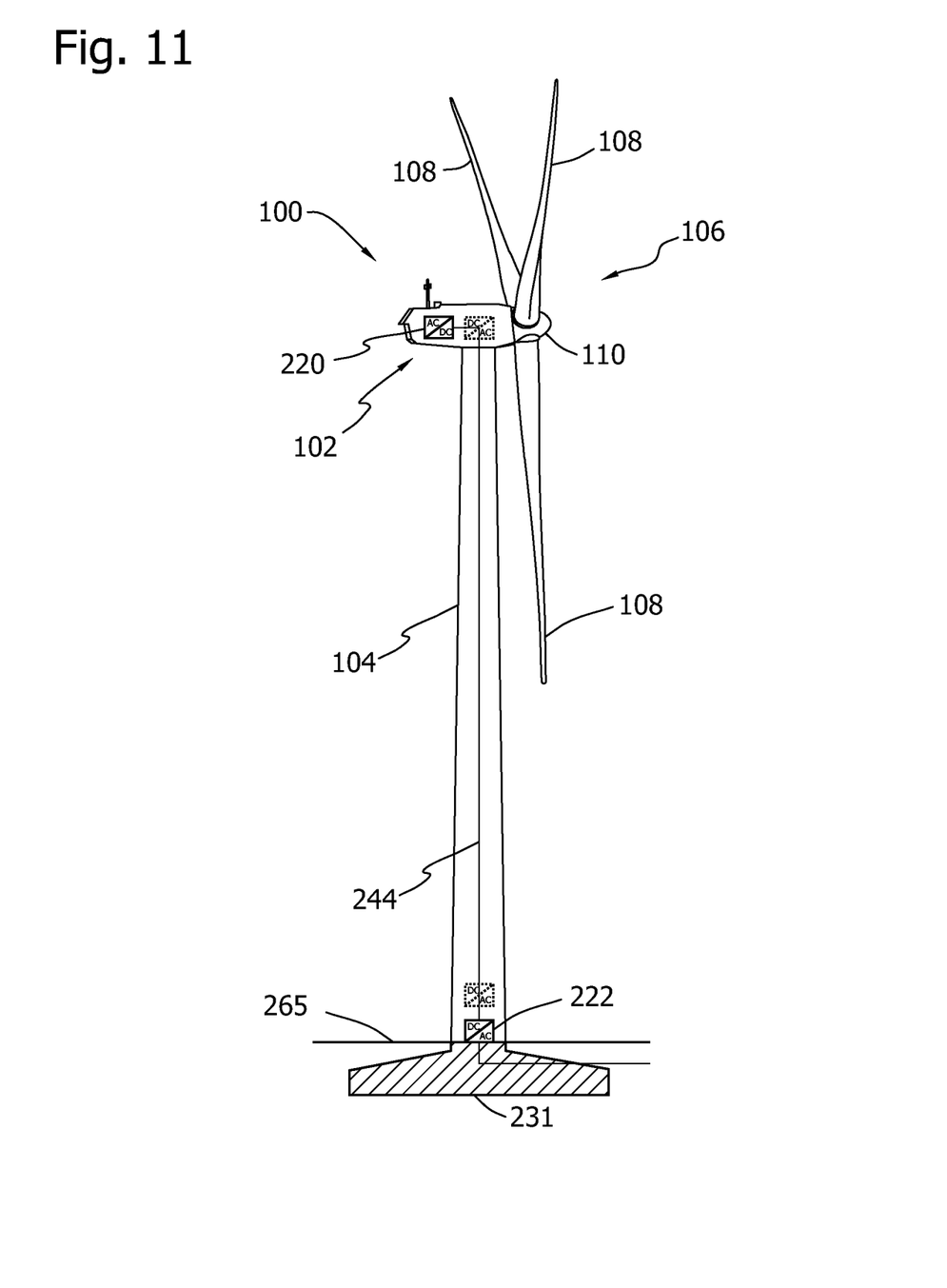
FIG. 11 is a schematic view according to embodiments herein showing a wind turbine with part of a conversion assembly positioned inside the tower.
Figure 12:
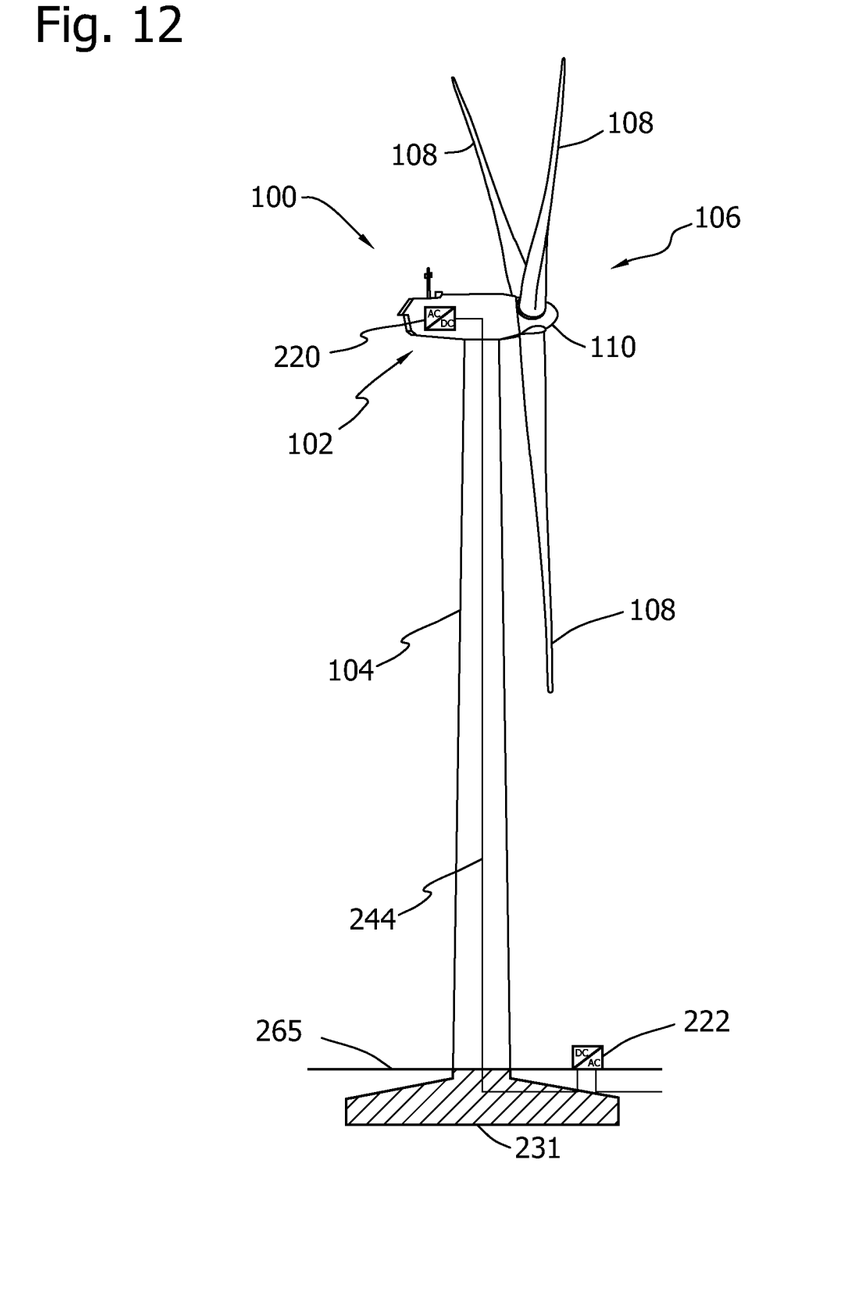
FIG. 12 is a schematic view according to embodiments herein showing a wind turbine with part of a conversion assembly positioned outside of the tower.

FIGS. 11 and 12 illustrate different locations of the line-side DC-AC power converter 222, including part of DC link 244 according to embodiments described herein. Typically, an AC-DC generator-side converter and part of a DC link remain attached to a power generator stator and are positioned inside of a wind turbine nacelle.

In FIG. 11, the DC-AC line-side power converter 222 may be positioned anywhere inside the tower 104 of wind turbine 100, normally close to surface 265. However, in embodiments herein line-side power converter 222 may also be positioned inside of nacelle 102. Further, it is conceivable that line-side power converter 222 is partly or fully embedded or submerged inside of support structure 231 below surface 265.

FIG. 12 illustrates positioning DC-AC line-side power converter 222 outside the tower of wind turbine 100. Line-side power converter 222 may be positioned above or below surface 265. In this case surface 265 may be representative of onshore ground level. However, in further embodiments, surface 265 may be, for example, water in an offshore environment.

In addition, and not limited to a particular embodiment described herein, a single central DC-AC line-side power converter may be connected to a plurality of AC-DC generator-side power converters of one or more wind turbines. Such layout enables a plurality of wind turbines to be interconnected to form, for example, an on- or offshore wind park with more redundancy, and further reduction in spatial and material requirements.

Figure 13:
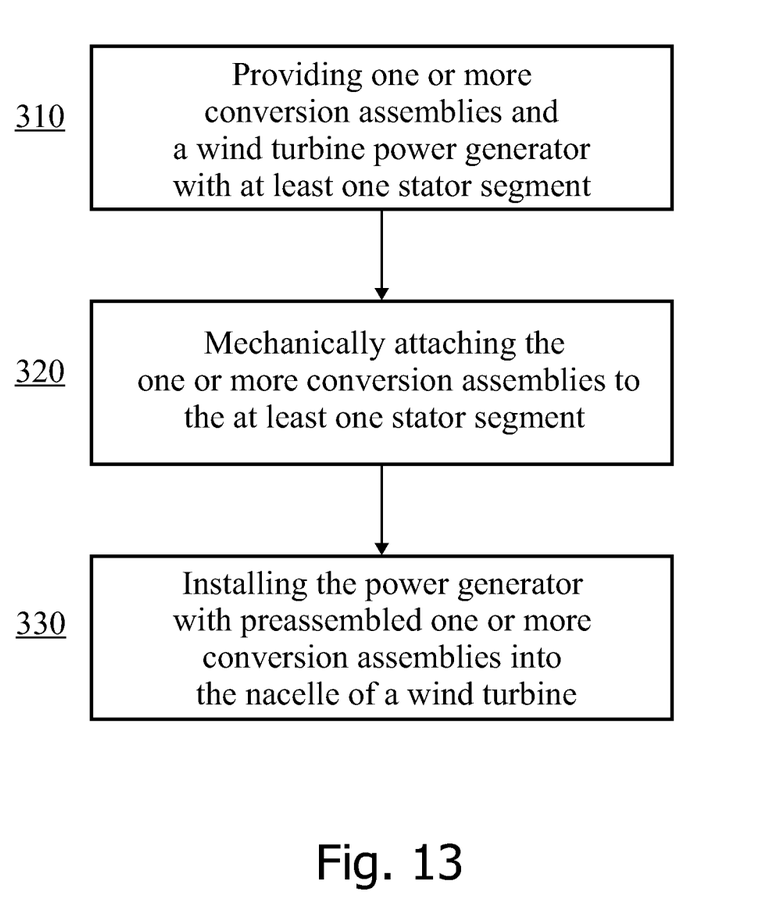
FIG. 13 is a block-diagram according to embodiments herein showing a method of attaching the conversion assembly to a stator segment of a wind turbine power generator.

FIG. 13 is a flow chart of a method for attaching one or more conversion assemblies to at least one stator segment of a wind turbine power generator. In block 310, one or more power conversion assemblies and a wind turbine power generator including at least one stator segment are provided. The one or more conversion assemblies are mechanically attached to the at least one stator segment, in block 320. Typically, now the electrical energy flow between the at least one stator segment and one or more conversion assemblies may be tested. Finally, in block 330 the power generator with preassembled one or more conversion assemblies is installed into the nacelle of a wind turbine.

The above-described systems and methods facilitate a more compact assembly of the power generator and conversion assembly, and also enable testing and harmonizing the two components with each other before installing them into the nacelle of a wind turbine. More specifically, a more compact assembly frees space in the nacelle, which enables the construction of smaller nacelles or allows for the integration of other equipment into the nacelle such as, for example, the main transformer or medium voltage switchgear. Additionally, material costs are reduced through shortened cooling system connections, reduced cable and conventional generator connections. Finally, due to the reduced cabling and connections, in case of malfunctions or normal wear through use it is easy to exchange the conversion assembly.

Exemplary embodiments of systems and methods for a wind turbine power generator including a stator with at least one stator segment, a rotor rotatably mounted in the stator and one or more power conversion assemblies are described above in detail. The systems and methods are not limited to the specific embodiments described herein, but rather, components of the systems and/or steps of the methods may be utilized independently and separately from other components and/or steps described herein. For example, attaching the conversion assembly on the radial surface of the at least one stator or radial surface of the generator housing and installing the components in a vertical wind turbine, and hence are not limited to practice with only the wind turbine systems as described herein. Rather, the exemplary embodiment can be implemented and utilized in connection with many other generators or converter applications in for, for instance, other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine power generator comprising:
    a stator segmented into two or more stator segments which are configured to operate independently from each other;
    a rotor rotatably mounted in the stator; and
    one or more conversion assemblies,
    wherein the one or more conversion assemblies are mechanically attached to the two or more stator segments.

2. The wind turbine power generator according to claim 1, wherein each of the two or more stator segments comprises a conversion assembly.

3. The wind turbine power generator according to claim 1, wherein each of the two or more stator segments comprises a breaker.

4. The wind turbine power generator according to claim 1, wherein the number of the one or more conversion assemblies is smaller than the number of the two or more stator segments.

5. The wind turbine power generator according to claim 1, wherein the number of the one or more conversion assemblies is larger than the number of the two or more stator segments.

6. The wind turbine power generator according to claim 1, wherein the one or more conversion assemblies are attached to the two or more stator segments at at least one element thereof, which is chosen from the list consisting of: a front side, a back side, a radial surface, and an inside.

7. The wind turbine power generator according to claim 1, wherein said one or more conversion assemblies include one generator-side converter and one line-side converter that are connected to each other via a DC link.

8. The wind turbine power generator according to claim 1, wherein said one or more power conversion assemblies include a generator-side converter and part of a DC link.

9. The wind turbine power generator according to claim 1, wherein said one or more conversion assemblies include generator-side converters and line-side converters, wherein the number of the line-side converters is equal or less than the number of the generator-side converters.

10. The wind turbine power generator according to claim 1, wherein said one or more conversion assemblies include generator-side converters that are connected in series to increase system voltage.

11. The wind turbine power generator according to claim 1, wherein said one or more conversion assemblies include generator-side converters that are connected in parallel.

12. A wind turbine comprising:
    a nacelle supported by a tower;
    at least one rotor blade to capture wind energy; and
    a power generator for converting the wind energy into electrical energy, comprising:
        a stator segmented into two or more stator segments, wherein each of the two or more stator segments is configured to operate individually;
        a rotor rotatably mounted in the stator; and
        one or more conversion assemblies,
        wherein the one or more conversion assemblies are integrally connected to the two or more stator segments.

13. The wind turbine according to claim 12, wherein each of the two or more stator segments comprises a conversion assembly.

14. The wind turbine according to claim 12, wherein the one or more conversion assemblies are attached to the two or more stator segments at at least one element thereof, which is chosen from the list consisting of: a front side, a back side, a radial surface, and an inside.

15. A method for attaching one or more conversion assemblies to a stator of a wind turbine power generator, the method comprising:
    segmenting the stator into two or more stator segments which are configured to operate independently from each other;
    providing the one or more conversion assemblies;
    mechanically attaching the one or more conversion assemblies to the two or more stator segments; and
    installing the generator comprising the preassembled one or more conversion assemblies into a nacelle of a wind turbine.

16. The method according to claim 15, wherein the one or more conversion assemblies are attached to the two or more stator segments at at least one element thereof, which is chosen from the list consisting of: a front side, a back side, a radial surface, and an inside.

17. The method according to claim 15, wherein said one or more conversion assemblies include a generator-side converter and part of a DC link.

18. The method according to claim 15, wherein said one or more conversion assemblies comprise a full frequency converter including a generator-side converter, a line-side converter and a DC link.

* * * * *